United States Patent
Lei et al.

(10) Patent No.: US 10,488,209 B2
(45) Date of Patent: Nov. 26, 2019

(54) METHOD AND APPARATUS FOR RECOMMENDING POWER-SAVING VEHICULAR UTILIZATION CHANGES

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 606 days.

(21) Appl. No.: 14/847,661

(22) Filed: Sep. 8, 2015

(65) Prior Publication Data
US 2017/0067746 A1  Mar. 9, 2017

(51) Int. Cl.
*G01C 21/34* (2006.01)
*G01C 21/36* (2006.01)

(52) U.S. Cl.
CPC ..... *G01C 21/3415* (2013.01); *G01C 21/3469* (2013.01); *G01C 21/3697* (2013.01)

(58) Field of Classification Search
CPC ............ B60L 2240/70; G01C 21/3415; G01C 21/3469; G01C 21/3492; G01C 21/3691; G01C 21/3682; G01C 21/367; G06Q 10/047; Y02T 10/7005; Y02T 10/7044; Y02T 10/705; Y02T 10/7291; Y02T 90/16
See application file for complete search history.

(56) References Cited

U.S. PATENT DOCUMENTS

| | | |
|---|---|---|
| 2011/0225105 A1 | 9/2011 | Scholer et al. |
| 2013/0093393 A1* | 4/2013 | Shimotani ................. B60L 3/12 |
| | | 320/109 |
| 2014/0052373 A1* | 2/2014 | Hoch ................... G01C 21/343 |
| | | 701/533 |
| 2014/0163877 A1 | 6/2014 | Kiyama et al. |
| 2014/0217976 A1 | 8/2014 | McGrath et al. |
| 2015/0127248 A1* | 5/2015 | Fisher ................. B60L 11/1861 |
| | | 701/414 |
| 2015/0168169 A1* | 6/2015 | Caceres ............. G01C 21/3492 |
| | | 701/537 |

* cited by examiner

*Primary Examiner* — Nga X Nguyen
(74) *Attorney, Agent, or Firm* — Michael Spenner; Brooks Kushman P.C.

(57) ABSTRACT

A system includes a processor configured to receive a desired departure time and route for upcoming travel, from a vehicle computing system. The processor is also configured to determine a traffic level based on the received time for the received route. The processor is further configured to determine a vehicle charge level and recommend a new route or departure time if the vehicle charge level is projected to be sufficient to achieve travel-completion based on the new route or departure time in accordance with the recommendation.

8 Claims, 4 Drawing Sheets

METHOD AND APPARATUS FOR RECOMMENDING POWER-SAVING VEHICULAR UTILIZATION CHANGES

TECHNICAL FIELD

The illustrative embodiments generally relate to a method and apparatus for recommending power-saving vehicular utilization changes.

BACKGROUND

Typically, electric vehicles will be periodically charged during some weekly time periods while the vehicle is located at a home location (or other long-term stay locations, such as at an office). Charging schedules, especially where the user pays for the power, may be varied based on observed utility rates, such that preferred charging often occurs when rates are lowest. The time periods associated with low rates can vary, and sometimes a vehicle needs more charge than can be obtained during the lowest-cost periods. To assist with charging decisions, automotive OEMs have provided web-based charging configuration and/or automated systems that can instruct charging based on present low-cost periods considered in conjunction with anticipated power needs (based on defined routes and or observed usage, for example). In such instances, vehicles typically upload a "go" time based on when an anticipated route will begin. Also, vehicles normally prepare the interior temperature based on when an anticipated route will begin. Even when a setting schedule is set at the vehicle, it may be tracked or managed by a back-end server and the desired/anticipated start time may consequently be uploaded as well.

SUMMARY

In a first illustrative embodiment, a system includes a processor configured to receive a desired departure time and route for upcoming travel from a vehicle computing system. The processor is also configured to determine a traffic level based on the received time for the received route. The processor is further configured to determine a vehicle charge level and recommend a new route or departure time if the vehicle charge level is projected to be sufficient to achieve travel-completion based on the new route or departure time in accordance with the recommendation.

In a second illustrative embodiment, a computer-implemented method includes determining a new departure time or travel route, projected to result in encountering less traffic than travel over a received preferred route beginning at a received preferred departure time and sending the new departure time or travel route to a user-device for confirmation.

A system comprising a processor configured to determine a projected travel time based on a projected traffic level over a preferred route beginning at a preferred departure time received from a vehicle computer. The processor is further configured to recommend an alternative departure time or alternative route resulting in a lower projected travel time, if a current vehicle charge level, received from the vehicle computer, is projected to be sufficient to complete travel utilizing the alternative departure time or alternative route.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
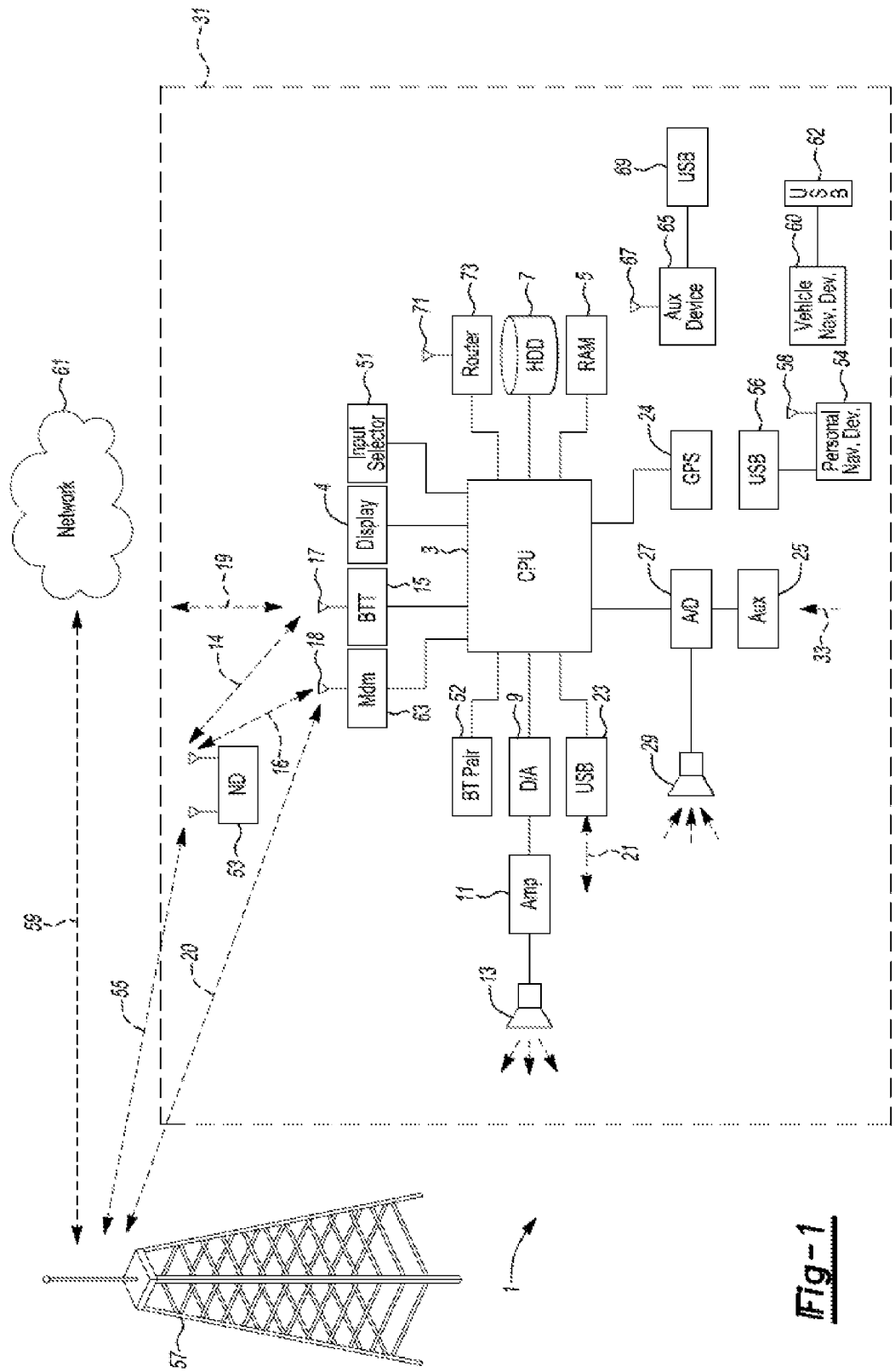
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which can offer 100 mbs or higher downlink speed. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having representative processes executed by a vehicle computing system located in a vehicle, in certain embodiments, the representative processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an illustrative, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In current telematics systems, the electric vehicles, such as battery electric vehicles (BEV) and plug-in hybrid electric vehicles (PHEV) normally upload their "go" time to the backend server upon setting their charging schedules. But, the current system has no way to remind the vehicle owners if the "go" time or preferred route conflicts with a known or predicted high traffic-level. By recommending a change in route and/or start time, additional power may be preserved, as well as achieving a more time-efficient journey to a destination.

Figure 2:
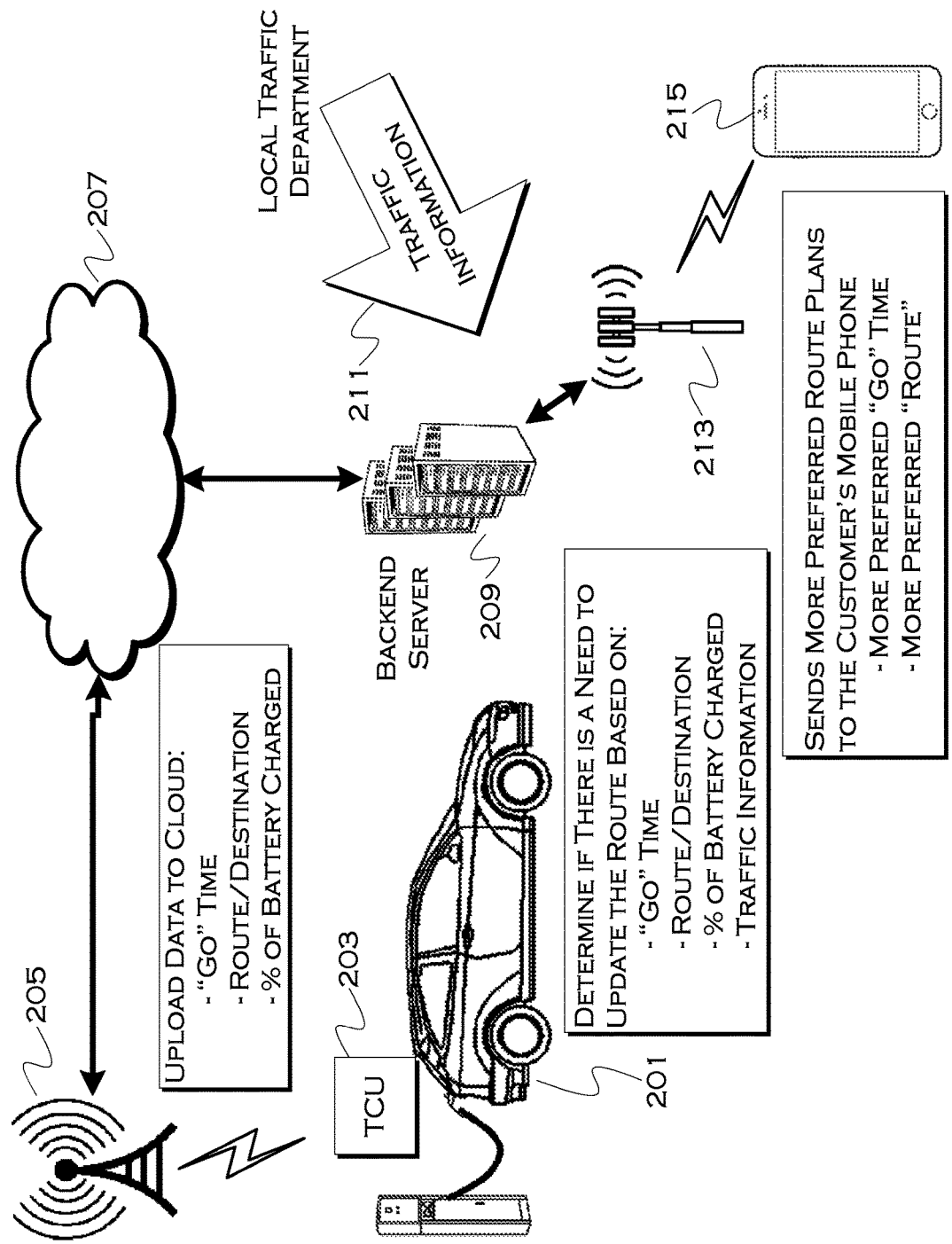
FIG. 2 shows an illustrative system for delivering vehicle utilization recommendations.

FIG. 2 shows an illustrative system for delivering vehicle utilization recommendations. In this illustrative example, a vehicle 201 is in wireless communication 205 with the cloud 207 through a telematics control unit (TCU) 203. The vehicle can use this connection (which eventually results in connection to a back-end server 209), to upload anticipated usage data, including, but not limited to, a projected—"go" time, a preferred route/destination, and a current charge percentage.

The backend server, upon receipt of the data for a given vehicle, can utilize traffic information 211 (both actual and predicted information, if desired), to determine if there is a better route or start time for the desired journey. Interestingly, this may correspond to higher traffic which can reduce wind resistance and increase regenerative braking, if the driver is more concerned with power conservation than travel time. Obviously lower traffic conditions can be considered if the driver is concerned with travel time. This consideration can also include a battery charge percentage. For example, if a user desires to travel 80 miles at 7:30 AM to a predefined destination, the system may determine that the route would have much less traffic if the vehicle left at 6:30 AM. But, if the present vehicle charge would only support a 20 mile journey, the system may also consider whether sufficient time remains between now and 6:30 AM in order to charge the vehicle for the trip. Such considerations may also include, for example, the charge needed to return home and/or the charge needed to reach a known alternative recharging point.

If a "better" route or start time is recommended and appropriate, the process may utilize a cellular network 213 to send the recommendation to a user phone 215. The user can then confirm or reject the change (which may also require an augmentation to a charging start-time, based on present charge and charge needed).

Figure 3:
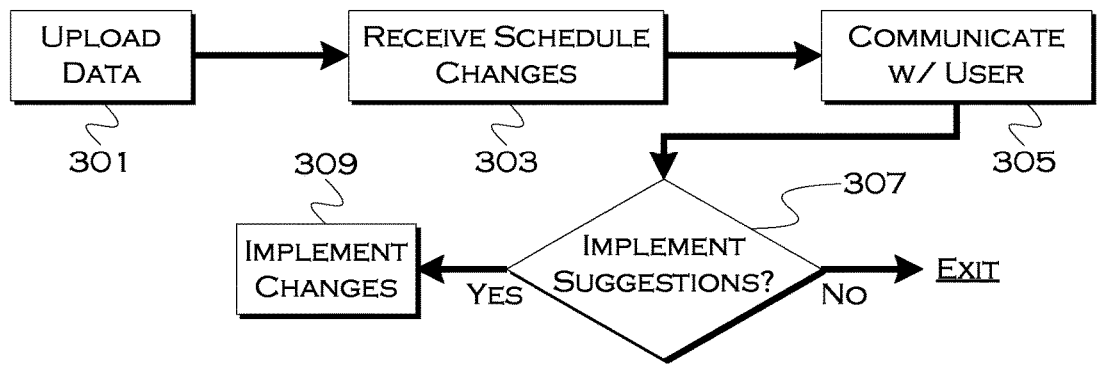
FIG. 3 shows an illustrative process for vehicle utilization change implementation.

FIG. 3 shows an illustrative process for vehicle utilization change implementation. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 3, the vehicle uploads data relating to planned usage (over some upcoming time period) to a remote server for processing and recommendation of alternative utilization plans 301. If any departure time, route changes and/or charging schedule changes result from the recommendations, the process will receive the recommended changes 303. In this example, the vehicle-based process then communicates with the user directly 305 to confirm implementation 307 of the suggested changes (or receive selection from a list of possible changes). If the user accepts or selects a change, the vehicle then implements the changes to, for example, a route planning process and/or a charging schedule. Any preconditioning based on projected start time may also be changed in accordance with the recommendation.

In another example, the backend server will handle the confirmation with the user, and can convey any needed changes to the vehicle as confirmed by the user. Any communication model that results in the vehicle implementing confirmed/selected changes is appropriate.

Figure 4:
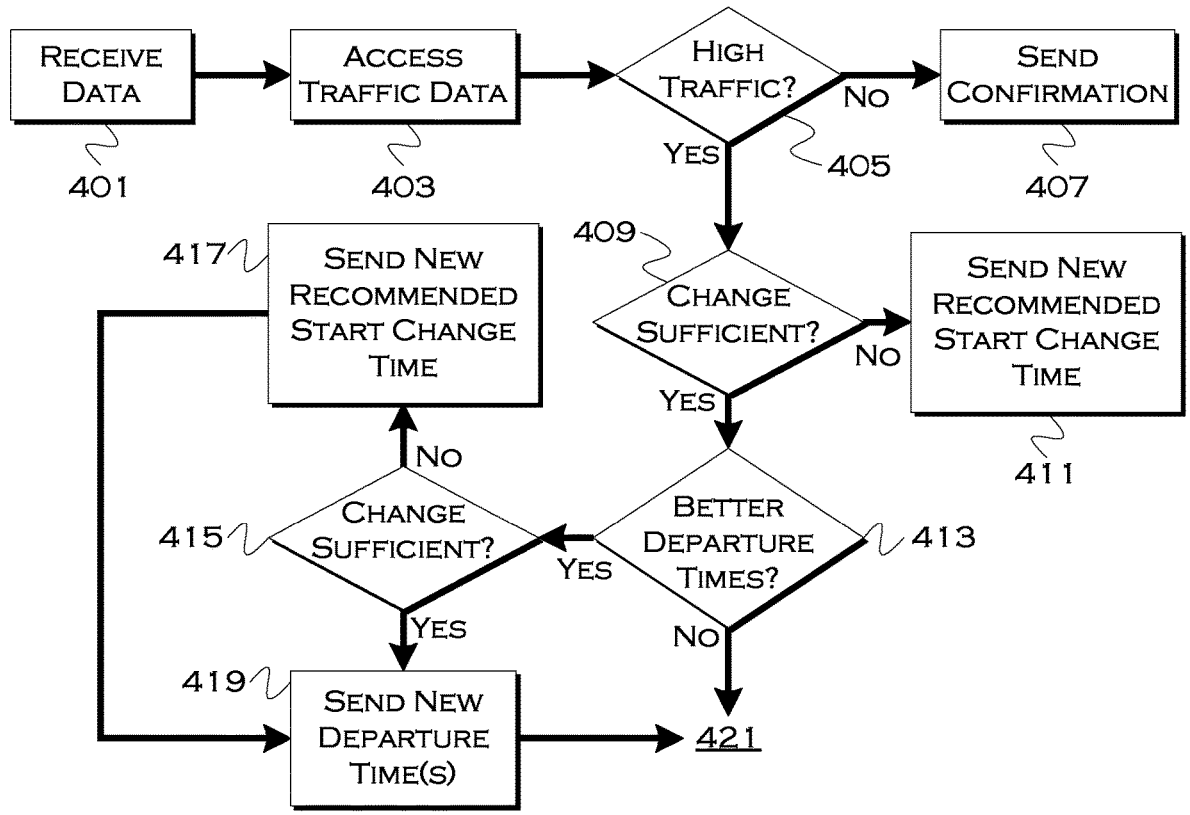
FIG. 4 shows an illustrative process for determining a recommended vehicle utilization change.
Figure 4:
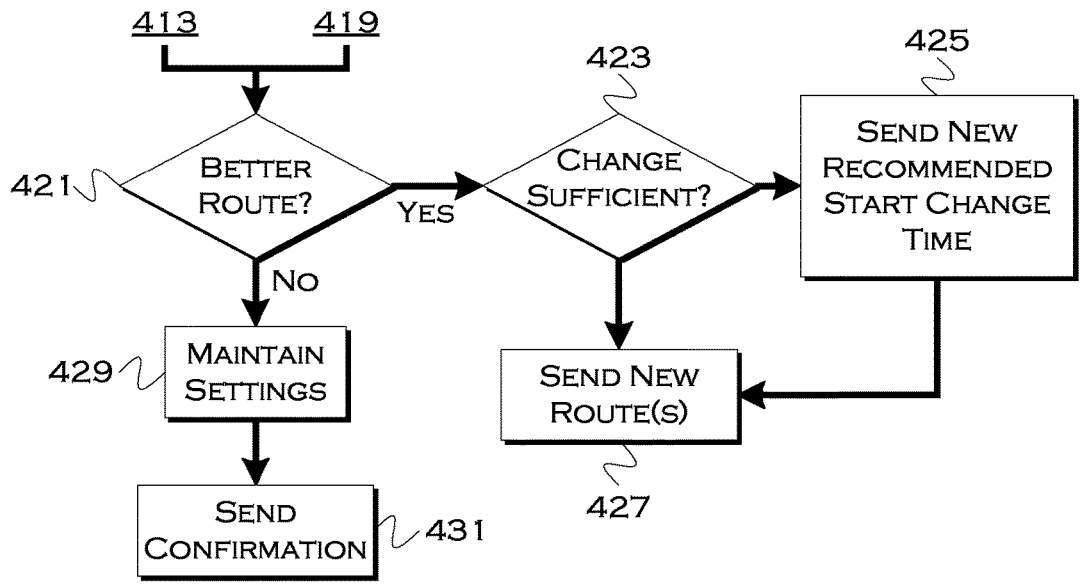

FIG. 4 shows an illustrative process for determining a recommended vehicle utilization change. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the backend server (being the entity that performs the recommendation calculation in this example), receives the relevant data relating to planned usage from the vehicle 401. This data could also be received from, for example, a schedule input into a user phone, and/or the phone itself could act as the recommendation providing entity (if in communication with the vehicle, directly or indirectly). In still another example, the vehicle itself could perform the recommendation processing, if suitable processing power and resources were available for use by a vehicle computing system.

In this example, the process then accesses traffic data 403. This can include present traffic data (for recommendations made on-the-spot) and projected traffic data based on observed traffic patterns for a given day of week, time and/or date. If high (or a threshold level of) traffic is not projected over a preferred route (or observed on a soon-to-be-taken route), the process may send a confirmation to the vehicle that the proposed utilization is appropriate 407. No action may also be taken, and the process may later update a recommendation based on a change in observed or projected traffic patterns (e.g., if an accident occurs).

If high traffic (or a threshold level of traffic) is observed or projected, the process may determine if a vehicle charge will be sufficient, based on a preferred charging start time, to complete the preferred route at the preferred start time. If the charge will not be sufficient, a recommendation to change the charge start time may be sent to the user 411. In other examples, the recommendation may be added to a list of possible recommendations, to be sent at one time for user selection (so that the user doesn't confirm a charge start time change and then, a few seconds later, receive a recommendation to take a different route or use a different departure time).

If a better departure time is determined to exist 413 (i.e., a departure time that will result in a faster journey based on current or projected traffic over a route beginning at the recommended start time), the process may then determine if a sufficient charge level, based on a current recharge start time and current charge level, for example, will exist to traverse the route (and/or return home or reach another recharge point) 415. If the charge level will not be or is not already sufficient, the process may recommend a new charge start time 417. Then, or if the charge level is or will be sufficient, the process may also recommend the new departure time 419. Again, this recommendation can be part of a list of possible actions based on a variety of recommendations.

For an example of the above, if a user typically leaves at 7:30 AM, but a departure of 6:30 AM is recommended, one of several scenarios may occur: a) the vehicle may already have an appropriate amount of charge for any projected utilization needs, even if the route begins earlier; b) the vehicle may be able to achieve the appropriate amount of charge, based on a present charge start time, by the time the new departure occurs (this will frequently be the case if a later departure is recommended); c) the vehicle may be able to achieve the appropriate amount of charge, based on a new charge start time, by the time the new departure occurs; or d) there is insufficient time remaining before the new departure time for the vehicle to achieve the appropriate amount of charge.

In an illustrative example, instances a) and b) above may merely result in a recommendation to change a departure time. Instance c) may result in a recommendation to change a departure time and a recommendation to change a charge start time. Instance d) may result in a decision to forego recommendation of the new departure time, since it will likely leave the user stranded. It is possible to recommend the new departure time in instance d) as well, but it may also be advisable to notify the user of any projected charge shortfall, so the user knows that an intra-day recharge may be needed.

Next, in the illustrative process, a determination if one or more better routes (i.e., faster routes and/or routes having less traffic or likelihood of traffic) exist 421. If there are no better routes the process may maintain present settings 429 and/or send any recommendations to the user relating to recommended changes that have not already been sent. A confirmation in accordance with user selections (if any) can also be sent at this time 431, following receipt of user selection and/or confirmation.

If there are better routes or a single better route, the process again determines if a charge level is or will be sufficient to complete travel over the new route(s). As above, this consideration can include a present charge level, a projected charge level and any charge determined to be needed to return home and/or reach a recharge point. If the charge is or will be insufficient, the process can recommend a new charge start time 425 as above. If the charge is or will be sufficient, or in conjunction with the charge start time change recommendation, the process can then recommend one or more new routes.

In each of the above instances, one or more recommendations may be provided. For example, a full set of recommendations may include, for example: 1) Notification that traffic will be high, and if a desired start time and route is to be maintained, recharging must begin a hour earlier to avoid insufficient power due to delays; 2) a recommendation to change a departure time from 7:30 to 8:30, including, if desired, a projected travel-time difference and/or power utilization difference; 3) a recommendation to change a departure time from 7:30 to 6:30 and a recommendation to begin recharge 30 minutes earlier, including any changes in travel time and power use as appropriate; 4) a recommendation to use alternative route A, including any changes in travel time and power use as appropriate; 5) a recommendation to use alternative route B and a recommendation to begin recharge 45 minutes earlier, including any changes in travel time and power use as appropriate; and 6) a recommendation to depart at 7:10, use alternative route B, and a recommendation to begin recharge 25 minutes earlier, including any changes in travel time and power use as appropriate.

As can be seen from the above example, recommendation 6) provides a departure time most-proximate to the desired departure time, but also uses an alternative route to ensure faster arrival and/or less power usage. In this case, route B may be slightly longer requiring a small adjustment to recharge time, which could also be based on the earlier start time. The user could select any recommended change desired, and the process could then send instructions to the vehicle to make the appropriate changes to charge time, route data and/or preconditioning start time, for example.

Figure 5:
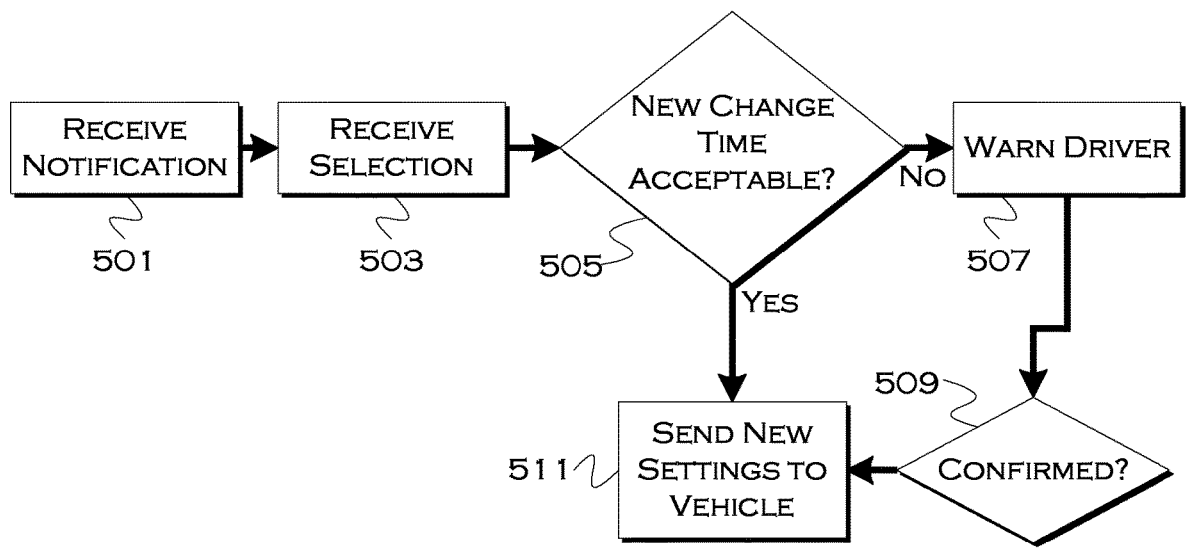
FIG. 5 shows an illustrative vehicle utilization change receipt and confirmation process.

FIG. 5 shows an illustrative vehicle utilization change receipt and confirmation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process represents a user-confirmation process running, for example, on a user device. Here, the user receives notification of a recommended change 501, including one or more recommendations for changes to departure time, route and/or recharge start time. The process receives user selection of the appropriate recommendation, and then, in this case, double checks to ensure that a new recharge start time was also elected and is appropriate for obtaining sufficient charge prior to the journey 505. If the charge will be sufficient, the process will send the new settings to the vehicle 511 (which can be indirectly done through the server, depending on the communication system employed). If the user selects a new departure or route, but does not wish to change the charge start time, the process may warn the driver that insufficient charge for projected usage is likely 507. If the driver confirms that this is ok (for example, if the driver knows they can recharge the vehicle at work, a fact of which the process may not be aware), then the process can send the changes to the vehicle. Otherwise, the driver may reject the change based on a desire not to change the charge start time and the process can exit without sending the changes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising a processor configured to: receive a desired departure time and route for upcoming travel, from a vehicle computing system;
   determine a traffic level based on the received departure time and route;
   determine a vehicle charge level; and
   recommend a new departure time, based on a determination that the new departure time will result in faster travel time to a destination if the vehicle charge level is projected to be sufficient to achieve travel-completion based on the new route or departure time;
   Wherein the vehicle charge level is a projected vehicle charge level based on a preferred charge start time;
   Wherein the processor is further configured to recommend a new charge start time if the projected vehicle charge level is projected to be insufficient to achieve travel-completion based on the new route or departure time.

2. The system of claim 1, wherein the traffic level is a present traffic level.

3. The system of claim 1, wherein the traffic level is a projected traffic level.

4. The system of claim 1, wherein the vehicle charge level is a present vehicle charge level.

5. The system of claim 1, wherein the processor is configured to recommend the new departure time in a message to a user device.

6. The system of claim 5, wherein the processor is configured to receive confirmation of acceptance of the new departure time from the user device.

7. The system of claim 6, wherein the processor is configured to send instructions to the vehicle computing system following confirmation receipt, informing the vehicle computing system of the accepted new departure time.

8. A system comprising:
   a processor configured to:
   determine a projected travel time based on a projected traffic level over a preferred route beginning at a preferred departure time received from a vehicle computer;
   recommend an alternative departure time resulting in a lower projected travel time if a current vehicle charge level, received from the vehicle computer, is projected to be sufficient to complete travel utilizing the alternative departure time; and
   recommend an alternative departure time and a vehicle start charge time, projected to result in a charging period providing sufficient vehicle charge level to complete travel utilizing the alternative departure time or alternative route, if the current vehicle charge level is projected to be insufficient to complete travel utilizing the alternative departure time or alternative route.

* * * * *